US011446847B2

(12) United States Patent
Hartmann et al.

(10) Patent No.: US 11,446,847 B2
(45) Date of Patent: Sep. 20, 2022

(54) PRESS FOR A CASTING MACHINE AND CASTING MACHINE

(71) Applicant: Kurtz GmbH, Kreuzwertheim (DE)

(72) Inventors: Lothar Hartmann, Leinach (DE); Yevgeniy Budnik, Kreuzwertheim (DE); René Michalski, Stockstadt/Main (DE)

(73) Assignee: Kurtz GMBH, Kreuzwertheim (DE)

( * ) Notice: Subject to any disclaimer, the term of this patent is extended or adjusted under 35 U.S.C. 154(b) by 237 days.

(21) Appl. No.: 16/758,231

(22) PCT Filed: Oct. 19, 2018

(86) PCT No.: PCT/EP2018/078768
§ 371 (c)(1),
(2) Date: Apr. 22, 2020

(87) PCT Pub. No.: WO2019/081377
PCT Pub. Date: May 2, 2019

(65) Prior Publication Data
US 2020/0353653 A1    Nov. 12, 2020

(30) Foreign Application Priority Data

Oct. 23, 2017   (DE) ...................... 20 2017 106 391.7

(51) Int. Cl.
*B29C 39/26*    (2006.01)
*B22D 17/12*    (2006.01)
(Continued)

(52) U.S. Cl.
CPC .............. *B29C 39/26* (2013.01); *B22D 17/12* (2013.01); *B22D 18/04* (2013.01); *B29C 39/36* (2013.01)

(58) Field of Classification Search
None
See application file for complete search history.

(56) References Cited

U.S. PATENT DOCUMENTS 5,066,217 A    11/1991  Fukuzawa et al.
2009/0126545 A1*  5/2009  Luebke ................. B30B 15/041
                                                83/72
(Continued)

FOREIGN PATENT DOCUMENTS

AT        308 306 B  *  6/1973
AT        3038306         6/1973
(Continued)

OTHER PUBLICATIONS

International Preliminary Report on Patentability, dated May 7, 2020, from International Application No. PCT/EP2018/078768, filed on Oct. 19, 2018. 14 pages.
(Continued)

*Primary Examiner* — Mohammad M Ameen
(74) *Attorney, Agent, or Firm* — HoustonHogle LLP

(57) ABSTRACT

The invention relates to a press for a casting machine and a casting machine with such a press. The press has a baseplate, an upper frame and a movable clamping platen, with two front columns and two rear columns arranged at the corner zones of the plates and at the corner zones of the upper frame. These columns extend through suitable through openings in the movable clamping platen and are fixed to the baseplate at the stationary upper frame. The press is characterized in that the front columns have a greater distance from one another than the rear columns. Because of this, essentially wider or longer permanent molds or those with side-protruding slides, up to a width corresponding to the increased distance apart of the front columns, may be inserted into the area between the baseplates and the movable clamping platen, and removed again. This means that better use can be made of the pressure and pressing capacity of the press, while the press is similarly or comparably simple, stable and compact in design and as advantageous (Continued)

Figure 1:
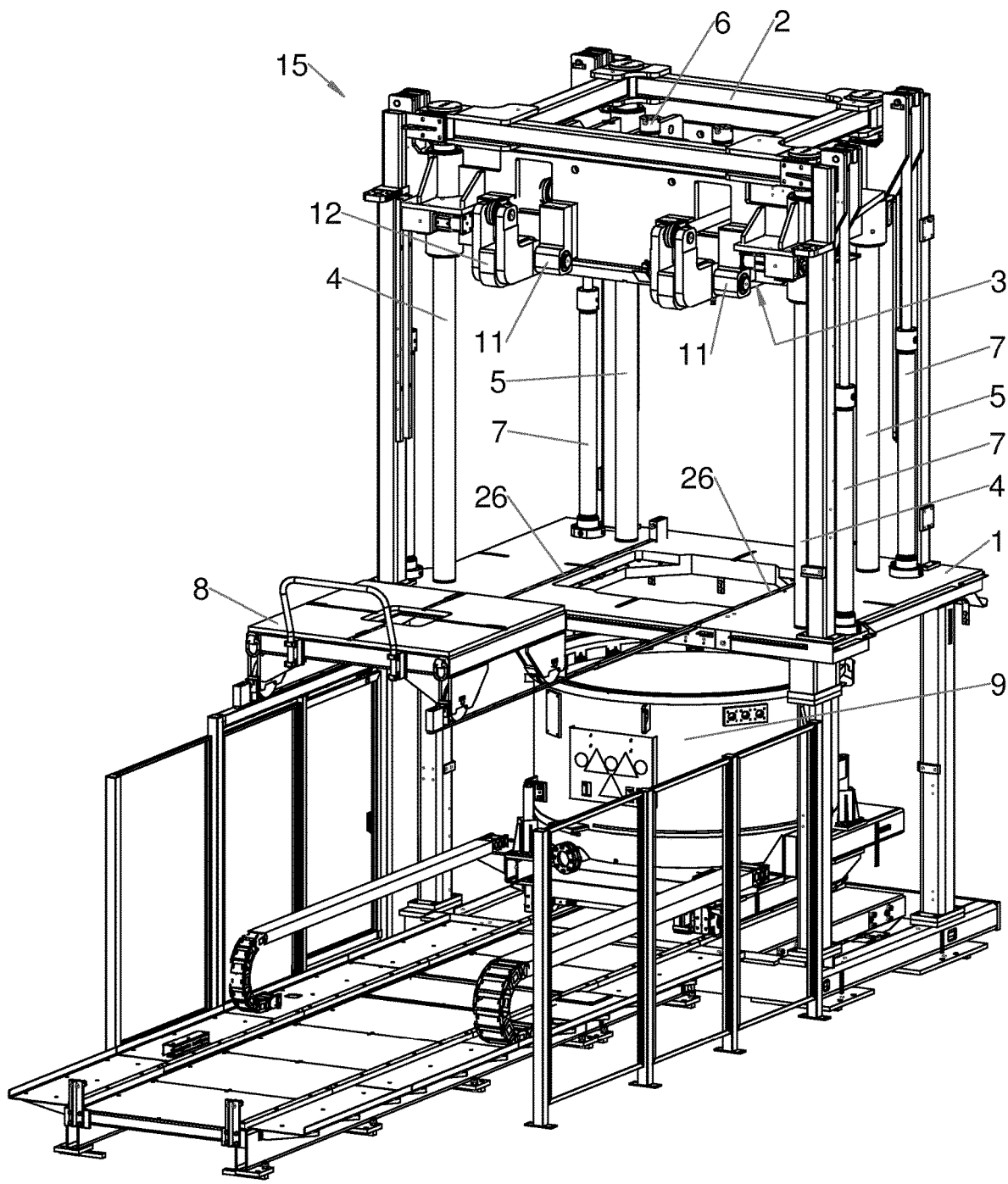

for production and maintenance as conventional presses with columns arranged in a rectangle.

8 Claims, 4 Drawing Sheets

(51) Int. Cl.
 *B22D 18/04* (2006.01)
 *B29C 39/36* (2006.01)

(56) References Cited

U.S. PATENT DOCUMENTS

| | | | |
|---|---|---|---|
| 2011/0038979 A1* | 2/2011 | Kumamoto | H01L 21/4842 425/411 |
| 2011/0219963 A1 | 9/2011 | Schuermann et al. | |

FOREIGN PATENT DOCUMENTS

| | | |
|---|---|---|
| DE | 2557645 | 6/1977 |
| DE | 102008048393 | 3/2010 |
| DE | 102015119243 | 5/2017 |
| EP | 1256396 | 11/2002 |
| JP | H10314996 | 12/1998 |
| WO | WO9211991 | 7/1992 |
| WO | WO-2017 081 026 A1 * | 5/2017 |
| WO | WO2017081026 | 5/2017 |

OTHER PUBLICATIONS

International Search Report of the International Searching Authority, dated Nov. 28, 2018, from International Application No. PCT/EP2018/078768, filed on Oct. 19, 2018. 5 pages.
Written Opinion of the International Searching Authority, dated Nov. 28, 2018, from International Application No. PCT/EP2018/078768, filed on Oct. 19, 2018. 5 pages.
German Search Report, dated Jan. 6, 2018, from German Application No. 20 2017 106 391.7, filed on Oct. 23, 2017. 7 pages.

* cited by examiner

PRESS FOR A CASTING MACHINE AND CASTING MACHINE

RELATED APPLICATIONS

This application is a § 371 National Phase Application of International Application No. PCT/EP2018/078768, filed on Oct. 19, 2018, now International Publication No. WO 2019/081377, published on May 2, 2019, which International Application claims priority to German Patent Application No. 20 2017 106 391.7, filed on Oct. 23, 2017, both of which are incorporated herein by reference in their entirety.

The present invention relates to a press for a casting machine, together with a casting machine, in particular a low-pressure casting machine with such a press.

Presses for casting machines generally have a stationary baseplate, a stationary upper frame, and a movable clamping platen arranged between them. The baseplate, the upper frame and the clamping platen are each fixed and/or guided on a column at their four corner zones. In operation a tool, a so-called permanent mold, is arranged between the baseplate and the clamping platen, while a bottom mold half of the permanent mold is fixed to the baseplate, and a top mold half is fixed to the clamping platen. To produce different molded parts, different permanent molds are provided in the press. The maximum width of the permanent molds is inevitably less than the distance between the two front columns, so that the permanent mold may be moved into and out of the press.

The presses are designed for a predetermined pressure, which corresponds to the volume of a mold cavity provided in the permanent mold. In practice it has been found that there are especially also thin, elongated molded parts which have a relatively low volume. The permanent molds then have a length and/or width which does not pass through the front columns. Such a permanent mold can then not be used with such a press, even though the pressure capacity of the press would be sufficient to operate the permanent mold. It is also known for permanent molds, for example, to have slides which protrude from the side of the permanent mold. Even if the permanent mold itself passes between the front columns, it may be that the slides protruding to the side no longer pass through and must be removed before the tool change. This means a much greater amount of work during tool change.

To date it has been necessary, in the case of wider permanent molds, to use presses with a greater distance between the columns in the width direction. In this way it is possible to use wider tools or tools with slides at the side. However, this increases the overall dimensions of the press, since for example supply lines and control units must always be accommodated outside the area enclosed by the columns and then come to lie behind or above or adjacent to this area. Depending on the nature of the application of the pressing force, for example if the pressing force is applied by two side-mounted press mechanisms then, in the case of permanent molds which are much smaller than the space between the columns, there may be increased bending loads on the movable clamping platen.

Known from DE 10 2015 119 243 A1 of the applicant is a press for a casting machine in which the press comprises a stationary baseplate, a stationary upper frame and a movable clamping platen, with two front columns and two rear columns arranged at the corner zones of the plates and connected to the movable clamping platen by means of guides and fixed to the baseplate and the stationary upper frame. In this press the front columns are fixed releasably to the baseplate and the upper frame, and are so movably mounted with respect to the baseplate, the upper frame and the clamping platen that they may be moved at least partly out of the area between the baseplate and the movable clamping platen. At the same time, the front columns may be fixed, e.g. by claws, either to the upper frame (working position) or to the movable clamping platen (permanent mold changeover position), so that the front columns, on raising of the movable clamping platen, are taken up with it. By this means it is possible to insert or remove a permanent mold, which is longer or wider than the distance between the front columns, into or out of the area between the baseplate and the movable clamping platen. However the upper frame, with attached components and with raised front columns fixed to the upper frame, may have a considerable tilting moment and exert a considerable bending moment on the rear columns. To reduce the tilting and bending moment it may be necessary to provide, between the upper frame and the baseplate, a tension mechanism adjacent to the rear columns and arranged at the side facing away from the front columns, in order to generate, with raised front columns, a tensile stress which compensates for the tilting and/or bending moment. The tension mechanism may comprise at least one hydraulic or pneumatic cylinder or a spindle drive.

The solution proposed in DE 10 2015 119 243 A1 is flexible but requires a high cost in terms of construction and materials, and is therefore more expensive than a conventional press. In addition, the moving parts such as the claws of the front columns and the parts of the tension mechanism require regular maintenance and, if necessary, adjustment, so as to ensure the trouble-free operation of the press. Also, the basic dimensions of the press are unchanged, so that the supply lines and control units need to be provided outside the area enclosed by the columns, as before.

Disclosed in DE 10 2015 119 243 A1 is a press for a casting machine, together with such a casting machine. The press comprises a baseplate, an upper frame and a movable clamping platen, with two front columns and two rear columns arranged at the corner zones of the plates and extending through suitable through openings of the movable clamping platen and fixed to the baseplate at the stationary upper frame. In particular, it is provided that the front columns are so movably mounted in the baseplate, the upper frame and the movable clamping platen that they may be moved at least partly out of the area between the baseplate and the movable clamping platen.

AT 308 306 B discloses an injection molding jaw mold. The injection molding jaw mold comprises two mold halves. A nozzle-side mold half has a mold clamping platen and a mold insert plate. A closer-side mold half has a mold insert plate, an intermediate plate, a punch insert plate and a mold clamping platen. The closer-side mold half also comprises two jaws. Each of the plates has holes at the four corner areas which serve to locate centring and guide elements and for the location of clamping elements. The relative guidance of the mold halves is effected by the guide sleeves and guide pins. The apparatus is characterized in that guide elements and jaws are interchangeable in order to accommodate different mold insert plates.

Disclosed in U.S. Pat. No. 5,066,217 A is a tension mechanism for an injection molding machine. A clamping system comprises a fixed plate attached to one end of a machine base, and a multiplicity of clamping cylinders, wherein the fixed plate holds a stationary part of a mold and the movable plate holds the moving part of the mold. Also provided are a multiplicity of connection rods which extend through the movable platen and include pistons at their ends.

The pistons are held movably in the clamping cylinders. In this way the movable platen may be moved towards the stationary plate.

Disclosed by EP 1256396 A1 is a forming press for pressure-medium-based forming of workpieces, in particular for internal high-pressure forming of hollow blanks. The forming press comprises a short-stroke cylinder for closing a forming tool. The short-stroke cylinder has a blocking jaw locking unit for a spindle drive with support spindle and spindle nut connected to the short-stroke cylinder. Mounted between the spindle nut and corresponding press upper beams are retractable blocking jaws, so that the forming tool, during the pressing operation via the short-stroke cylinder, the spindle drive and the blocking jaws, is supported against the press upper beam and a corresponding press lower beam.

Disclosed in WO 92/11991 A1 is a mold support plate, mounted so as to be capable of sliding on several parallel guide rods. The support plate comprises a substantially rectangular front plate element, for holding a mold element and a substantially rectangular rear plate element.

The plates include guide openings, so that the front and rear plate elements are mounted with the ability to slide on the several parallel guide rods. Also provided are several longitudinal support elements and transverse support elements, for supporting the two plate elements.

The invention is based on the problem of creating a press for a casting machine, together with a corresponding casting machine, with which the pressure and pressing capacity of the press can be better utilized, and which at the same time is similarly or comparably simple, stable and compact in design and as advantageous in production and maintenance as conventional presses with columns arranged in a rectangle.

The problem is solved by the subjects of the independent patent claims. Advantageous developments are set out in the respective dependent claims.

A press according to the invention for a casting machine comprises a stationary baseplate, a stationary upper frame, and a movable clamping platen, wherein two front columns and two rear columns are arranged at the corner zones of the plates and connected to the movable clamping platen by means of guides, and fixed to the baseplate and the stationary upper frame.

The press is characterized in that the front columns have a greater distance from one another than the rear columns.

By this means it is possible for a permanent mold which is longer and/or wider than the distance between the rear columns to be inserted into and removed from the area between the baseplate and the movable clamping platen. In this way it is possible to obtain better utilization of the pressing capacity of the press, while slides can remain on the tool during tool changeover. At the same time, the space next to the rear columns is available for supply lines and control units, so that these do not extend too far beyond the lateral dimension of the press defined by the spacing of the front columns. Since the rear columns continue to stand close together, the average width of the movable clamping platen is less than in the case if the rear columns comprise the widened column spacing. The movable clamping platen may therefore be more rigid.

In embodiments, an angle between a feed direction of the press and a connecting line between axes of each rear column and front column may be at least 10°, in particular at least 30° and/or a maximum of 60°, in particular a maximum of 45°.

The guides of the clamping platen for guidance on the columns may be through openings in the clamping platen. They may however also be in the form of guide elements located outside the clamping platen. Such guides may comprise several rollers, rotatably mounted on a bearing fixed to the clamping platen and abutting the columns, so that the clamping platen can roll on the columns by means of the rollers.

The press is preferably a vertical press, i.e. the columns are arranged vertically.

Preferably provided on the upper frame is a lifting mechanism, to which the clamping platen is connected, so that the clamping platen may be moved vertically.

Preferably the movable clamping platen is formed of a clamping frame and a swivel plate mounted pivotably thereon. A swivel joint between the clamping frame and the swivel plate is located in the area adjacent to the front columns, so that the swivel plate is pivotable downwards and upwards relative to the clamping frame. By this means a mold half of the permanent mold which is fastened to the swivel plate may be so swiveled into the press that a mold surface bounded by the mold half is easily accessible and therefore easily cleaned.

A casting machine according to the invention has a press as described above, wherein the area between the baseplate and the movable clamping platen is designed to hold a permanent mold. The casting machine is preferably a low-pressure casting machine.

The press according to the invention has been provided and developed for casting machines. Such a press may however also be provided for other applications in which objects to be pressed are arranged between two press plates (here: baseplate and movable clamping platen) which are of a size greater than the distance between the two front columns.

The baseplate and the clamping platen may also be in the form of frame-like elements. The important thing is that they are so designed that an object placed between them may be subjected to a desired pressing force. Whether the pressing force is transmitted at a selective point or points or else flatly depends on the application concerned.

The invention is explained in detail below, by way of example, with the aid of the drawing, which shows in:

FIG. 1 an embodiment of a casting machine with press in a perspective view

Figure 2:
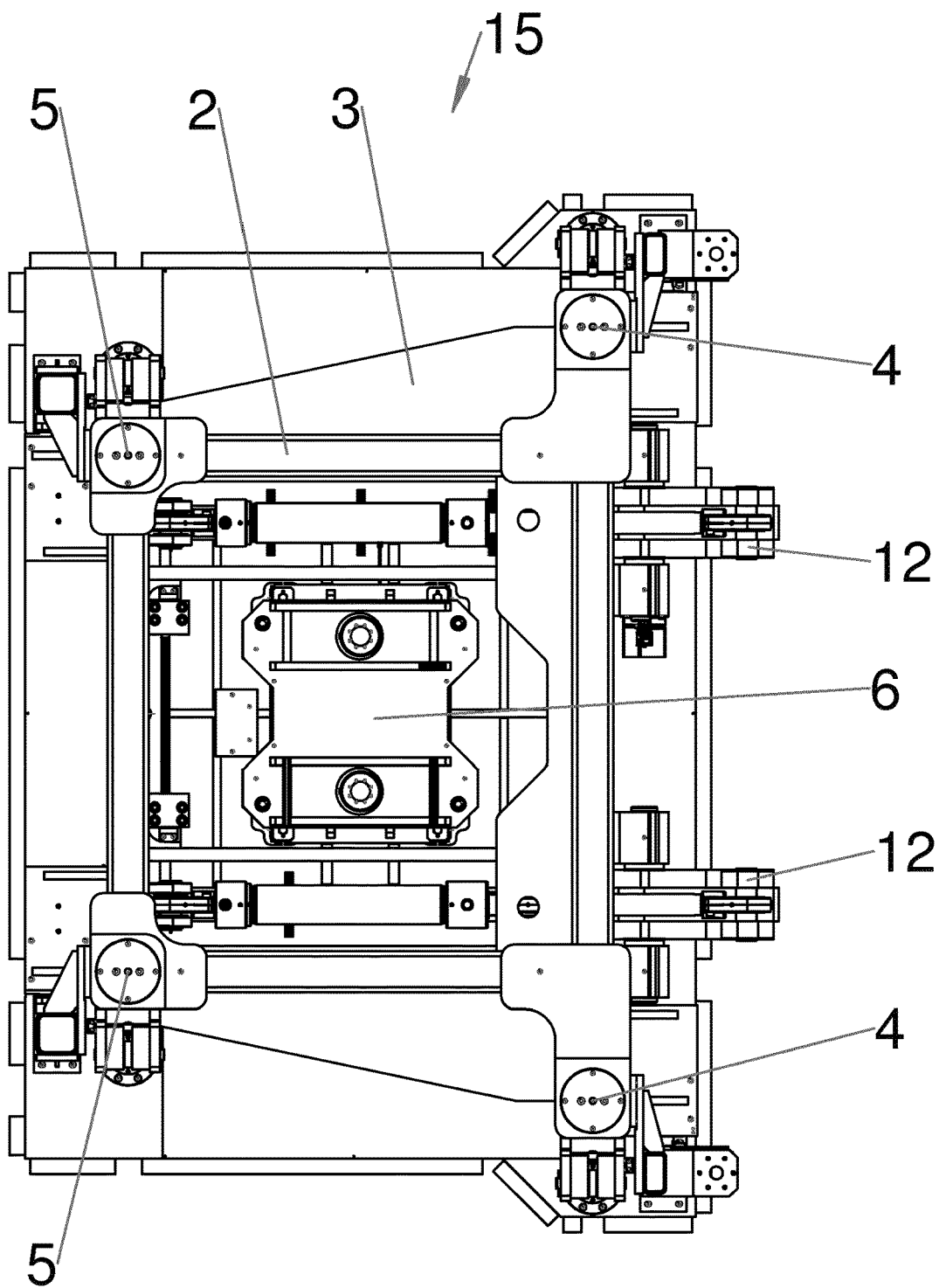

FIG. 2 a top view of the casting machine of FIG. 1 in the area of the press

Figure 3:
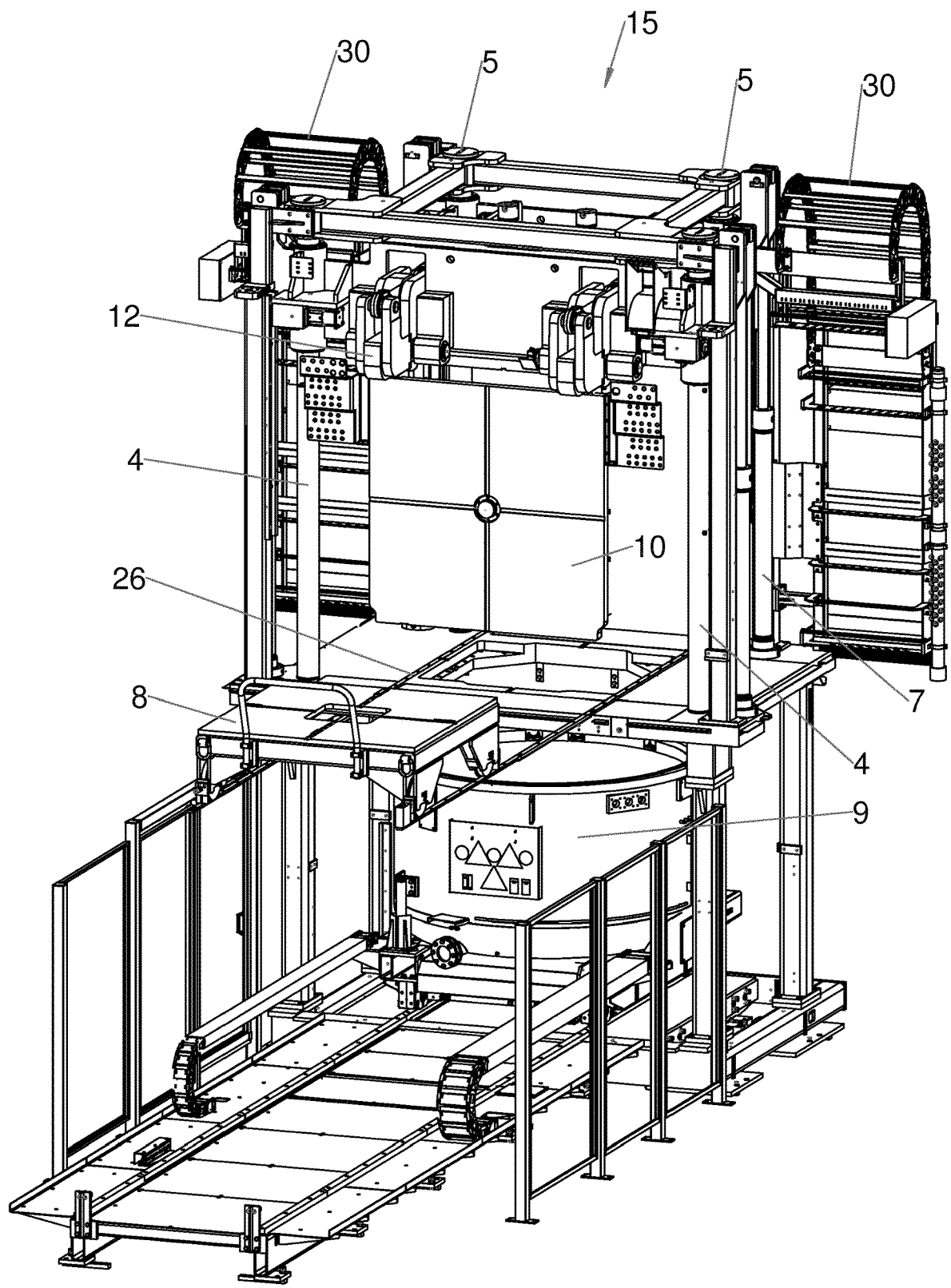

FIG. 3 a view according to FIG. 1 with attachments and tilted plate, and

Figure 4:
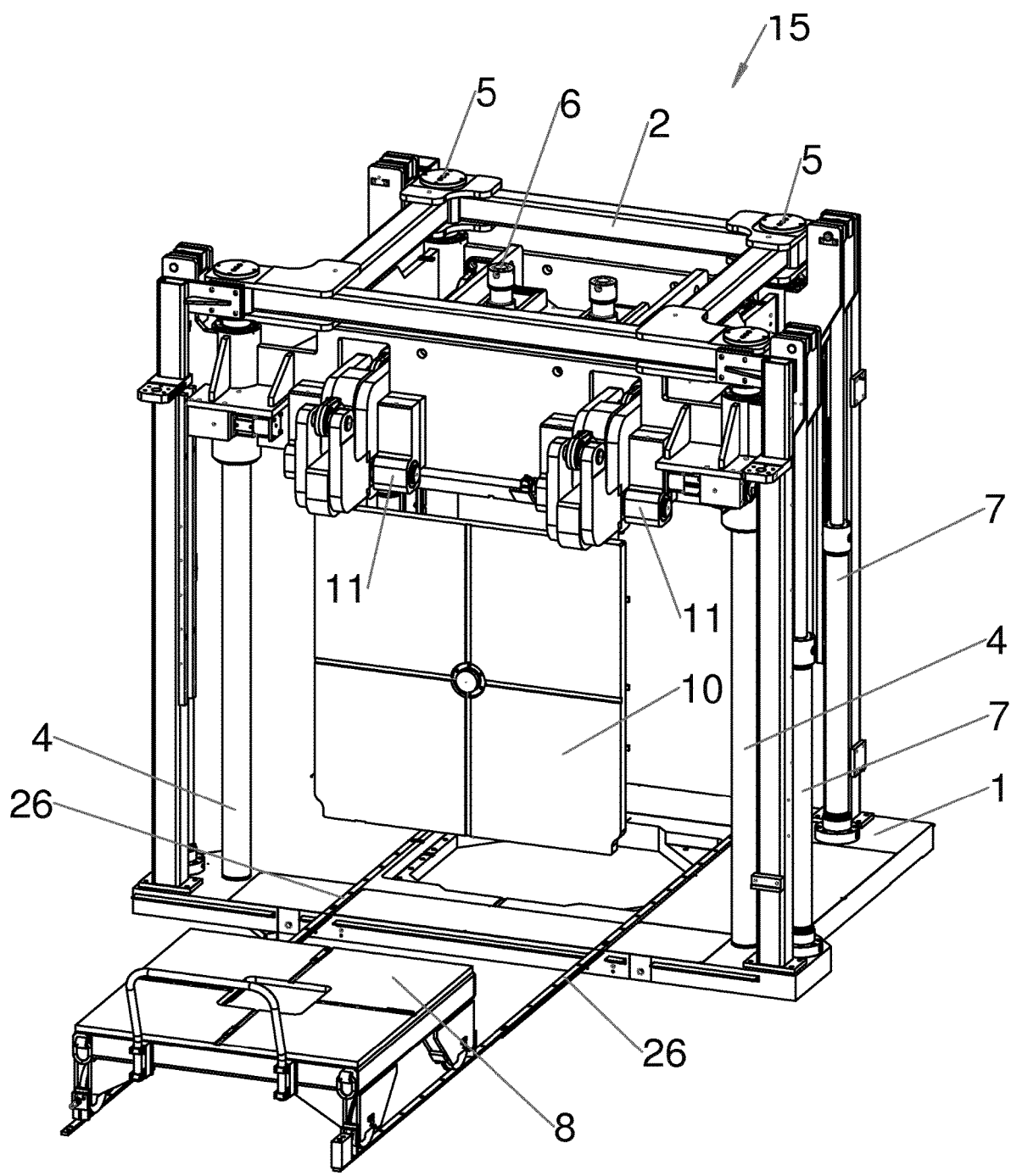

FIG. 4 an enlarged view of the casting machine of FIG. 1 in the area of the press and with tilted plate.

A casting machine 15 according to the invention has a horizontal baseplate 1, an upper frame 2, and a movable clamping platen 3 mounted between them. Provided at the corner zones of the plates 1, 3 and the upper frame 2 are two front columns 4 and two rear columns 5 which extend basically from the baseplate 1 to the upper frame 2 and serve to keep them apart (FIG. 1 and FIG. 2). The baseplate 1, the upper frame 2 and the movable clamping platen 3 are arranged parallel to one another.

The columns 4, 5 extend through suitable through openings in the movable clamping platen 3 and serve to guide the movable clamping platen 3, so that the movable clamping platen 3 is always arranged parallel to the baseplate 1 and the upper frame 2. The through openings in the movable clamping platen 3 form guides for guiding the columns 4, 5 relative to the clamping platen 3.

The baseplate 1 and the movable clamping platen 3 are plate-shaped elements. They may however also be in the form of a frame-like stand. In the embodiment shown in FIG. 1, the upper frame 2 is in the form of a frame-like stand. The upper frame 2 may however also be in the form of a plate-shaped element.

A lifting mechanism has in the present embodiment four hydraulic cylinders 7, which are located adjacent to the columns 4. The lifting mechanism may also be provided centrally at the upper frame 2 and connected to the clamping platen 3.

An ejector mechanism 6 is provided on the clamping platen 3 and has one or more hydraulic cylinders, by which an ejector plate and ejector pin located thereon may be actuated to eject a finished molded part from a permanent mold.

Two supply blocks 30 with supply lines and the like are provided in each case to the side of the rear columns 5. FIG. 3 shows only the relevant groups of lines of the supply block 30. The supply blocks 30 have a multiplicity of electrical and hydraulic lines, which are omitted from FIG. 3 to allow a simple illustration of the apparatus. Viewed from the front, the supply blocks 30 do not extend, or extend only slightly, beyond the front width of the press, which is preset by the front columns 4. The supply lines are especially hydraulic lines and electrical lines, by which the individual components of the casting machine 15 may be controlled. The supply lines may also include media lines for the conduct of cooling media for cooling a permanent mold.

Provided on the baseplate 1 are rails 26, which extend from a front edge of the baseplate 1 to a rear edge of the baseplate 1. The rails 26 may also be extended forward beyond the front edge. The rails 26 serve for guiding a carriage 8, by means of which the permanent molds may be moved into or out of the press.

A swivel plate 10 may be fixed to the movable clamping platen 3 by means of a swivel joint 11. This swivel plate 10 serves to hold a top mold half of the permanent mold, which may be fixed to the swivel plate by suitable mounting mechanisms. The swivel plate is provided with an hydraulic swivel mechanism 12, by which a swivel movement of the swivel plate relative to the movable clamping platen 3 may be controlled.

The swivel joints 11, by which the swivel plate 10 is fixed to the movable clamping platen 3, extend with their swivel axis along a connecting line of the two front columns 4, or they are arranged with their swivel axes adjacent and parallel to such a connecting line. By this means the swivel plate 10 with the top mold half of the permanent mold may be swiveled downwards from the movable clamping platen 3 in such a way that the top mold half is arranged with its inner surface roughly in the area between the front columns. This allows easy access to the inner area of the top mold half when the latter is cleaned. Since the front columns 4 are a large distance apart, a suitably large top mold half may be swiveled into the area between the two columns 4.

Insertion of a permanent mold into the casting machine is carried out in an essentially known manner:

At the start, there is no permanent mold in the casting machine.

After the permanent mold has been moved into the casting machine 15, the movable clamping platen 3 is lowered on to the permanent mold, and the permanent mold is fixed to the movable clamping platen. The two mold halves of the permanent mold are locked together.

The movable clamping platen 3 is then lifted a little, so that the permanent mold is raised from the carriage 8. The carriage 8 is thus free and may be moved out of the casting machine 15 along the rails 26.

After the carriage 8 has been removed, the clamping platen 3 together with the permanent mold is lowered until the permanent mold lies on the baseplate 1. The baseplate 1 may be provided with centring elements, so that the permanent mold is automatically correctly positioned on lowering. Such centring elements are for example in the form of sliding blocks. These centring elements or sliding blocks may also be provided in different arrangements on different baseplates, in order to exercise a coding function. In this way it is possible to ensure that only one permanent mold, which is also provided for this purpose, is inserted in a specific casting machine 15.

The permanent mold is fixed on the baseplate and is therefore available for casting processes.

Provided for the low-pressure casting process is a furnace 9 located beneath the baseplate 1 which, by means of a riser pipe extending through the baseplate 1, leads into the permanent mold and supplies the permanent mold with melt from below (FIG. 1).

The top mold half of the permanent mold may, as required, e.g. for cleaning work, be lifted with the movable clamping platen 3 and so swiveled by means of the swivel joint 11 and the swivel plate 10 that its inner surface is easily accessible.

Removal of the permanent mold from the casting machine is the reverse of insertion of the permanent mold, in that first the permanent mold is raised, then a carriage 8 is moved in and the permanent mold lowered on to the carriage 8. Finally, the carriage 8 with the permanent mold on it is moved out of the casting machine.

Due to the greater spacing of the front columns 4 it is possible to use in the casting machine permanent molds which exceed the space between the rear columns 5. The casting machine 15 according to the invention is therefore significantly more flexible than conventional casting machines in respect of permanent molds to be inserted and is simultaneously just as simple, comparatively lightweight and yet stable in design.

The permanent molds often weigh more than 10 t and may be up to 40 tin weight.

The invention may be briefly summarized as follows:

The invention relates to a press for a casting machine and a casting machine with such a press. The press has a baseplate, an upper frame and a movable clamping platen, with two front columns and two rear columns arranged at the corner zones of the plates and at the corner zones of the upper frame. These columns extend through suitable through openings in the movable clamping platen and are fixed to the baseplate at the stationary upper frame. The press is characterized in that the front columns have a greater distance from one another than the rear columns. Because of this, essentially wider or longer permanent molds or those with side-protruding slides, up to a width corresponding to the increased distance apart of the front columns, may be inserted into the area between the baseplates and the movable clamping platen, and removed again. This means that better use can be made of the pressure and pressing capacity of the press, while the press is similarly or comparably simple, stable and compact in design and as advantageous for production and maintenance as conventional presses with columns arranged in a rectangle.

LIST OF REFERENCE NUMBERS

1 baseplate
2 upper frame 3 movable clamping platen
4 front column
5 rear column
6 ejector mechanism
7 hydraulic cylinder
8 carriage
9 furnace
10 swivel plate
11 swivel joint
12 swiveling mechanism
15 casting machine
26 rails
30 supply block

The invention claimed is:

1. A press for casting machine comprising a stationary baseplate, a stationary upper frame, and a movable clamping platen, wherein
provided at the corner zones of the plates and at the corner zones of the upper frame are two front columns and two rear columns which are connected to the movable clamping platen by means of guides and are fixed to the baseplate and the stationary upper frame
wherein
the front columns are at a greater distance from one another than the rear columns.

2. The press according to claim 1
wherein
the columns span a trapezoid viewed from above.

3. The press according to claim 1
wherein
an angle between a mold feed direction of the press and a connecting line between axes of each rear column and front column amounts to at least 10°.

4. The press according to claim 1
wherein
an angle between a mold feed direction of the press and a connecting line between axes of each rear column and front column amounts to a maximum of 60°.

5. The press according to claim 1
wherein
an hydraulic cylinder is provided for moving the movable clamping platen.

6. The press according to claim 1
wherein
the movable clamping platen comprises a clamping frame and a swivel plate pivotably attached to the former, wherein a swivel joint is provided between the clamping frame and the swivel plate in the area adjacent to the front columns, so that the swivel plate is pivotable downwards and forwards relative to the movable clamping platen.

7. A casting machine with a press according to claim 1, wherein
the baseplate is designed to hold a permanent mold.

8. The casting machine according to claim 7
wherein
the casting machine has an ejector mechanism.

* * * * *